United States Patent [19]
Dowdell

[11] 3,949,193
[45] Apr. 6, 1976

[54] CREDIT CARD READER HAVING TWO MAGNETIC READOUT HEADS

[75] Inventor: Edward F. Dowdell, Massapequa, N.Y.

[73] Assignee: Electrospace Corporation, North Bergen, N.J.

[22] Filed: Jan. 7, 1974

[21] Appl. No.: 431,134

[52] U.S. Cl............. 235/61.11 D; 360/43; 360/121
[51] Int. Cl.² ...................... G06K 7/08; G11B 5/02
[58] Field of Search ................ 360/43, 121, 51, 52; 235/61.11 D

[56] References Cited
UNITED STATES PATENTS

| | | | |
|---|---|---|---|
| 2,885,488 | 5/1959 | Andrews............................. | 360/121 |
| 3,272,969 | 9/1966 | Cutaia.......................... | 235/61.11 D |
| 3,749,889 | 7/1973 | Vaskunas et al............. | 235/61.11 D |
| 3,825,728 | 7/1974 | Nakauchi..................... | 235/61.11 D |
| 3,831,188 | 8/1974 | Zupancic..................... | 235/61.11 D |

*Primary Examiner*—Stanley M. Urynowicz, Jr.
*Attorney, Agent, or Firm*—Friedman & Goodman

[57] ABSTRACT

A credit card reader is described which includes two magnetic readout heads whose gaps are spaced from each other a distance equal to one half the distance between adjacent, uniformly spaced bits of binary coded information. The coded data is recorded on a linear length of the credit card. The two similar sets of signals are extracted, one delayed relative to the other, as the heads scan the data. Decoding circuitry is described which provides information corresponding to the recorded data independently of the relative speed at which the credit card is moved or is swept past the readout heads.

8 Claims, 14 Drawing Figures

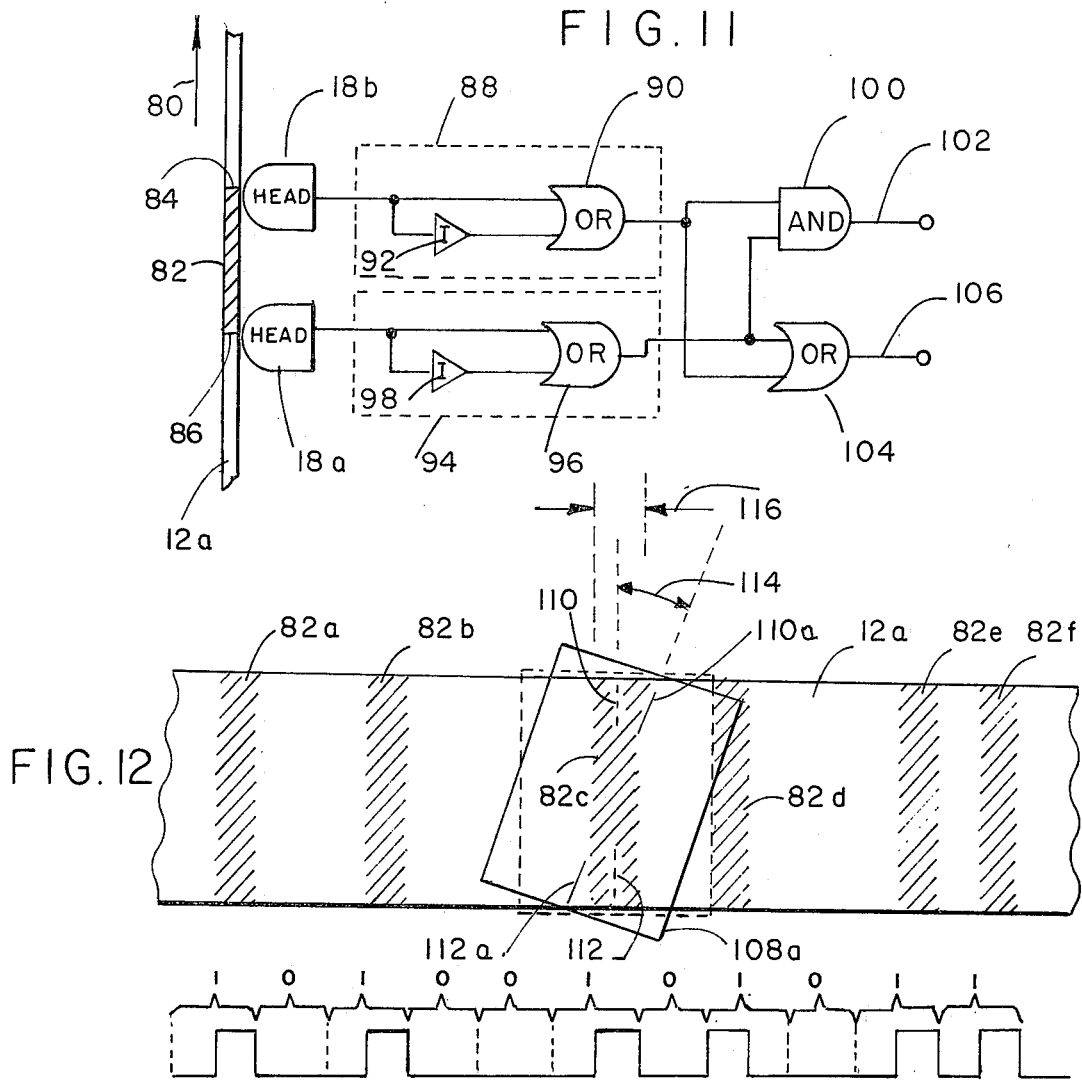
FIG. 11
FIG. 12
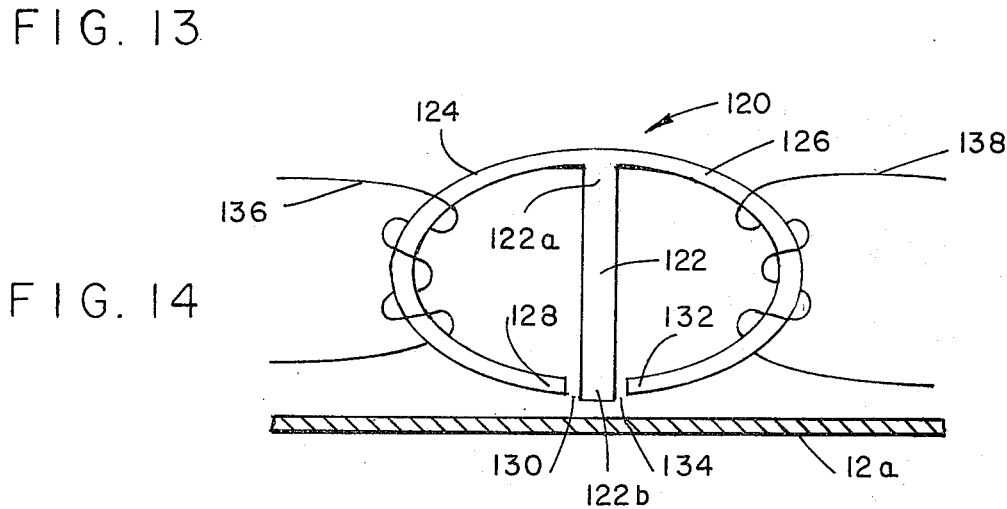
FIG. 13
FIG. 14

CREDIT CARD READER HAVING TWO MAGNETIC READOUT HEADS

BACKGROUND OF THE INVENTION

The present invention generally relates to credit card reading systems, and more particularly to a credit card reader for reading binary coded data recorded on credit cards and the like independently of the speed at which the credit card is moved relative to the readout means.

There has recently been developed numerous electronic systems for reading price tags, credit cards and similar documents. Typically, conventional magnetic heads are used which are moved relative to the item from which recorded data is to be extracted. A major problem in the known systems has been the great dependency of the systems upon the variations in distance or speed of movement of magnetic reading heads relative to the material being read. For example, such variations may produce distortions, low amplitude outputs, or otherwise provide unsatisfactory or incorrect output data.

One approach recently has been to provide precise mechanical designs which insure that tape, for example, bearing the recorded data, moves past the readout head at a constant speed. In addition to the great expense involved in designing and manufacturing such a mechanical system, the complexity of the same lends itself to frequent malfunction and difficulty in making repairs to the same.

One approach to remove the emphasis from constant speed reading systems has been to place more reliance on electronic circuitry which compensates for the irregularities caused by the mechanical speed variations. These electronic circuits are also complex in construction and generally suffer similar disadvantages above described.

A more recent approach has been the utilization of Hall-effect readout heads which effectively eliminate the need for much of the electronic circuitry heretofore required. The use of Hall-effect heads has also considerably reduced the requirement of mechanical complexity of the system. See, for example, "Hall-Effect Magnetic Sensor Reads Data At Any Speed", Electronics, February 1, 1973; and "New Hall-Effect Heads Hold Big Promise", Japan Electronic Engineering, September, 1972.

While the Hall-effect magnetic sensors have eliminated some of the problems inherent in prior art systems, they themselves suffer from temperature instability problems. Consequently, some of the circuit complexity eliminated by the utilization of Hall-effect readout heads is reintroduced in the form of temperature stabilizing and compensating networks which prevent erroneous output data readouts.

Accordingly, the prior art devices have still not provided a simple, inexpensive mode of reading out data from credit cards, for example. Such a device is, very desirable, however, for use in equipment such as POS (Point of Sale) terminals. With such equipment, where sales personnel operate the same, it is necessary that the equipment furnish accurate data irrespective of the manner in which the sales personnel manually operate the equipment. More particularly, correct output readings are required independent of the speed of movement of the credit card relative to the readout device.

SUMMARY OF THE INVENTION

It is an object of the present invention to provide a credit card reader which is not possessed of the above described disadvantages inherent in comparable prior art credit card readers.

It is another object of the present invention to provide a credit card reader of the type under discussion which is simple in construction and economical to manufacture.

It is still another object of the present invention to provide a credit card reader which provides accurate readout data substantially independently of the speed of movement of the credit card relative to the readout head.

It is yet another object of the present invention to provide a credit card reader of the type above described which provides accurate output data independently of speed of movement of the credit card relative to the read out device and which is relatively independent of temperature variations.

It is a further object of the present invention to provide a credit card reader of the type under discussion which generates a series of clock pulses derived from the credit card and which are in synchronism with the data recorded on the card independently of the speed of movement at which the credit card is moved relative to the readout device.

It is still a further object of the present invention to provide a credit card reader which is simple in construction and which is suitable for reading two frequency coherent phase recorded coded data frequently specified by users of credit cards who seek to standardize the manner in which data on credit cards is coded.

It is yet a further object of the present invention to provide a double magnetic head unit which is particularly suitable for use in connection with a credit card reader as above suggested.

To achieve the above objects, as well as others which will become apparent hereafter, a credit card reader for reading binary coded data recorded along a length of a credit card, the coded data being in the form of uniformly spaced bits of information, comprises two readout means spaced along a predetermined direction for reading the data on the credit card as the data moves past the respective readout means. Said readout means are spaced from each other a distance corresponding to approximately one half the distance between two adjacent bits recorded on the credit card. The credit card is movable relative to said readout means to maintain the length of the credit card on which the data is recorded proximate to said readout means and in alignment with said predetermined direction. Decoding means are provided which are connected to said readout means for decoding the data read by the latter and for generating output signals corresponding to the recorded data independently of the relative speed of movement between said readout means and the credit card.

In a presently preferred embodiment, wherein the data is magnetically recorded on the credit card, said two readout means comprise two magnetic readout heads. Advantageously, guide means is provided for moving the credit card relative to said readout means to maintain the length of the credit card on which the data is recorded proximate to said readout means and aligned with said predetermined direction. In this manner, said readout means scans and extracts the recorded data as the readout means moves along said length of said credit card.

A magnetic readout head, in the form of an E-shaped core of magnetic material, is described which forms two spaced gaps suitable for use in connection with the above described credit card reader.

While the credit card reader described herein is described in conjunction with double frequency coherent phase coded data, the basic concept of the present invention contemplates the utilization of the same or similar credit card reader with other forms of coded information, as will readily become apparent to persons skilled in the art.

As will become evident, the subject invention eliminates most of the above-mentioned disadvantages inherent in prior art readout devices and is particularly suitable for use in equipment such as point of sale terminals operated by sales personnel.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 11 is a schematic representation of a ciricuit utilized for decoding signals of the type illustrated in FIGS. 3–6 when magnetically recorded on a credit card;

FIG. 12 is a schematic representation of a strip of magnetic tape on which signals have been recorded in accordance with the Aiken code, and further showing one arrangement of magnetic reading heads which can be utilized to read the coded information stored on the magnetic tape in accordance with the present invention;

FIG. 13 is an illustration depicting the signals present on the tape shown in FIG. 12, FIGS. 12 and 13 being in aligned relationship to illustrate the coded signals which are represented by the magnetized areas on the tape of FIG. 12; and FIG. 14 is a schematic representation of an E-shaped core which forms two spaced readout heads suitable for utilization in the credit card reader of the present invention.

DESCRIPTION OF THE PREFERRED EMBODIMENTS

As described above, techniques and systems for reading out recorded data stored in binary coded form has, in the past, depended to a great extent on the precision with which the scanning of the data took place. Since most prior art systems utilize an internal clock for generating clock pulses, it becomes important that the speed or rate of scanning corresponds or be consistent with the clock frequency. The invention, to be disclosed in connection with the embodiments shown in the FIGURES, and to be described below, obviates this critical dependence on scanning or readout rate to obtain correct output information.

Figure 1:
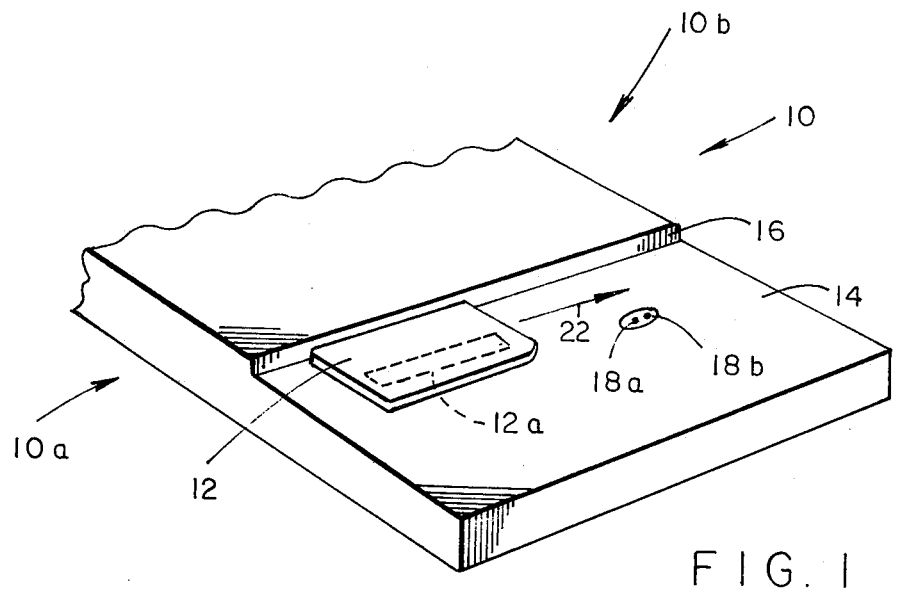
FIG. 1 is a schematic perspective view of one embodiment of a credit card reader in accordance with the present invention, and showing the manner in which a credit card to be read is advanced relative to magnetic heads fixed on the card reader stand.

Referring to FIG. 1, there is schematically shown one embodiment of a credit card reader stand 10 in accordance with the present invention which can form a POS (Point of Sale) terminal.

As presently contemplated, a credit card 12 provided with a coded magnetic strip of tape 12a, as to be more fully described hereafter, is placed on a support surface 14. An edge substantially parallel to the magnetic strip 12a is placed in abutment against an index or a guide surface 16. The credit card 12 is positioned, for example, on the clerk's side 10a of the credit card reader stand 10 and slidably moved towards the customer's side 10b, maintaining the credit card 12 in abutment with both the support and guide surfaces 14 and 16 respectively.

Fixed on the support surface 14 are magnetic readout heads 18a and 18b, spaced from each other along the direction of movement of the credit card 12 generally indicated by the arrow 22. The magnetic readout heads will be described in more detail hereafter. Also to be described is the circuity which generates output signals corresponding to the data recorded on the magnetic strip 12a irrespective of the velocity or speed at which the credit card 12 is slidably moved past the magnetic readout heads 18a, 18b.

Figure 2:
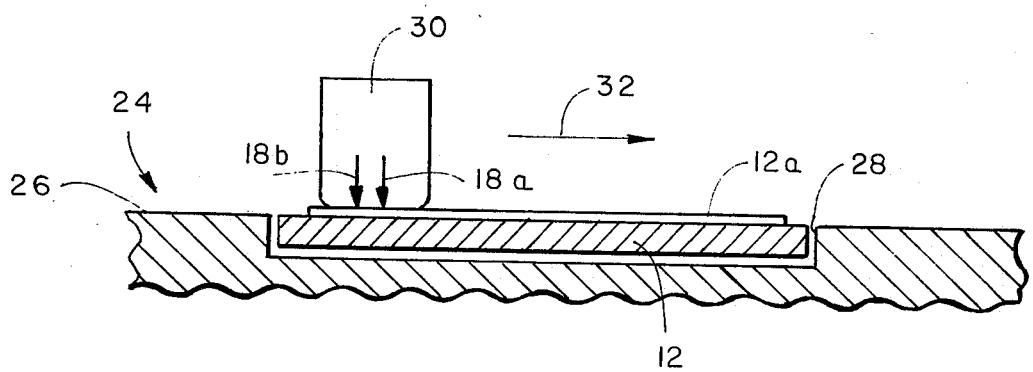
FIG. 2 is a side elevational cross section of a schematic representation of a second embodiment of a credit card reader stand, showing the credit card to be read disposed within a recess of the stand and a movable sliding unit carrying the magnetic heads scanning the magnetic strip provided on the credit card.

Referring to FIG. 2, a second embodiment of a possible credit card reader stand 24 is schematically shown. Here, a support surface 26 is provided within which a recess 28 is formed dimensioned to receive the credit card 12 with little clearance therebetween. The credit card 12 is placed into the recess 28 with the magnetic strip 12a facing upwardly, as opposed to the first embodiment shown in FIG. 1, wherein the magnetic strip 12a faces downwardly during operation of the credit card reader.

In the second embodiment, a movable sliding unit 30 is provided which is movable along the length of the magnetic strip 12a by any conventional guide means (not shown). Mounted on the movable sliding unit 30 are two spaced magnetic heads 18a and 18b, represented by the arrows in FIG. 2. As will be noted, the arrows are spaced from each other along the length of the magnetic strip 12a. In both embodiments, the magnetic heads sweep or scan the magnetic strip successively. In this manner, each of the magnetic heads reads out the same data stored on the magnetic strip, one readout head 18a first reading the data and readout head 18b reading the same data at a delayed or later point in time — the delay primarily depending upon the velocity or speed at which the credit card 12 moves relative to the magnetic heads.

The relative movement between two spaced readout heads and a strip of recorded binary data, together with circuitry described, permits accurate reading of the stored data irrespective of the relative scanning or readout velocity between the readout heads and the recorded strip. Specific embodiments of the present invention will be described in connection with FIGS. 3–14 wherein magnetic readout heads and a magnetically recorded strip of data is described. However, it should be clear, that persons skilled in the art can readily adapt the principles of the present invention to readout systems utilizing mechanical, optical, electrical or any other known means for recording data. In each case, readout means for reading the selected form of stored data are disposed similarly as shown in FIGS. 1 and 2 in place of the magnetic readout heads 18a and 18b. Aside from some minor modifications which would be readily apparent to those skilled in the art, the credit card stands described in FIGS. 1 and 2 could still be used. The output signals extracted by the readout means would in each case be transmitted to electronic decoding circuitry which could be the same as that to be described irrespective of the form of the nature of the stored data or of the readout heads.

A specific embodiment of the present invention will now be described. For this purpose, the description will be made in connection with a credit card reader. However, as suggested above, the same principle could equally be applied for reading out information from any other document provided with a similar or comparable strip of recorded data.

The presently preferred embodiment will be described in connection with recorded data recorded in accordance with the Aiken or the two frequency coherent phase recording code. This code will be described because it has been specified by the American Banking Association and by the International Air Transport Association for use on credit cards utilized in connection with Banking and Airline Services. It will become clear from the description that follows, however, that any other suitable binary code can be utilized to code information without losing the primary advantages of the present invention. Slight modifications in the decoding or processing circuitry may be required, however, when codes other than the two frequency coherent phase recording code is utilized.

Figure 3:
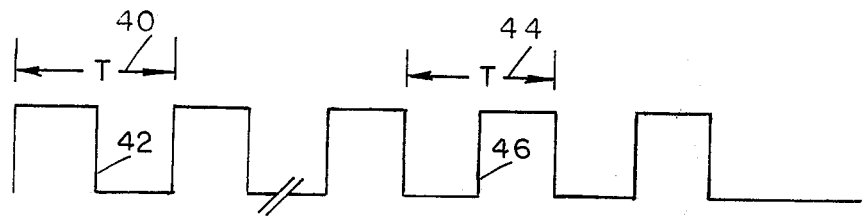
FIGS. 3–6 are representations of signals coded according to the Aiken code or the two frequency, coherent phase recording code utilized in the description of the credit card readers shown in FIGS. 1 and 2.

Referring to FIG. 3, a train of pulses is shown having a period 40 designated by the letter "T". It will be noted that within the period 40 there is a negative going transition 42. Similarly, within the period 44 there is a positively going transition 46. In effect, within each period "T" there is provided a full cycle wherein one transition takes place.

Figure 4:
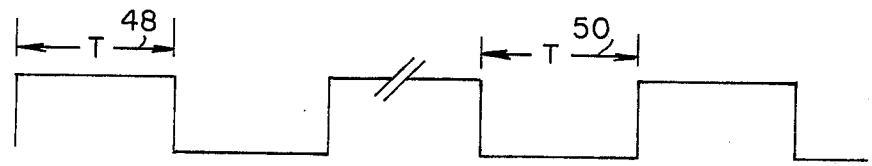

In FIG. 4, a train of pulses is shown which has a frequency one half of the frequency of the pulses shown in FIG. 3. Consequently, within the same span "T" there is no transition that takes place. Within the interval 48 a high level is present without a transition taking place. Similarly, within the interval 50 the pulse train takes on a low value, again with no transition taking place.

The relationships shown in FIGS. 3 and 4 define the two frequency phase coherent recording code. In effect two separate frequencies are utilized. Whenever pulse trains having a high frequency appear it is generally utilized to designate a binary "1" state while the appearance of a lower frequency pulse is generally utilized to designate a "0" state. The test, therefore, to ascertain whether a "1" or "0" state is present is to examine each fixed period "T" to determine whether a transition takes place therein. As suggested by the transitions 42 and 46 it is not important if the transition is positive or negative going, as long as a transition takes place. Similarly, when no transition takes place within a period "T", a "0" state is indicated irrespective of whether the absolute level of the pulse is high or low. This is suggested by the periods 48 and 50.

Figure 5:
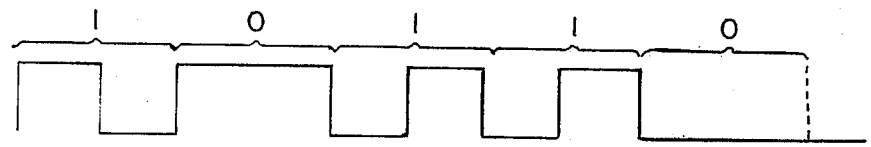

In FIG. 5, an example of a pulse train in accordance with the two frequency phase coherent recording code is shown. Breaking down the total message into equal periods, it readily becomes apparent that the coded information represents a 1-0-1-1-0 signal.

Referring to FIGS. 6–11, the principle and the circuitry of the present invention will be specifically described. As suggested in the Background of the Invention, work on credit card readers, such as reading magnetic strip information from the back of a card, involves great difficulty in obtaining reliable and accurate information due to variations between the "internal electronic clock" and "reading head" timing or movement.

An analysis of the circuit functions reveal that the conventional internal electronic clock is a means of relating the present reading head information to the head information at a time $t$ before. The reasons for maintaining timing or "synchronization" between the head movement [represented by $(ds/dt)_h$] and a clock represented by $dt_c$) is to enable the evaluation of $ds$ which represents the actual physical position of the recorded data on a magnetic strip. This is conventionally achieved by making $(ds/dt)_h$ of the head a constant [i.e. acceleration or $(ds/dt)'_m$ of the motor equal to zero]. The frequency of the clock, represented by $dt_c$ must be matched to the $dt$ of the head represented by $dt_h$. Since the head movement timing is related to a motor speed $d\theta/dt$, frictional and stiction losses represented by $dP/dt$, belt or drive surface whips, etc, there are many practical difficulties in maintaining time synchronization in order to accurately read $ds$ or spacing information.

For the above reasons, the design of the present invention is based on a spacing or dimension oriented system substantially independent of timing relationships conventionally used in the prior art. The present system is based upon the realization that the purpose of a time "delay" or a clock is to give information at two positions on a tape. This two-head system eliminates the need for a clock by having reading gaps displaced a half binary bit apart. The densities of binary bits utilized in most magnetic card systems, including those specified by the American Banking Association and the International Air Transport Association, is typically 75 bits per inch. Consequently, the two readout heads or reading gaps of magnetic heads in accordance with the present invention will generally be displaced 1/150th of an inch.

Figure 6:
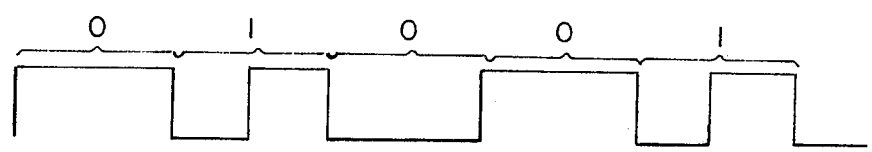
Figure 7:
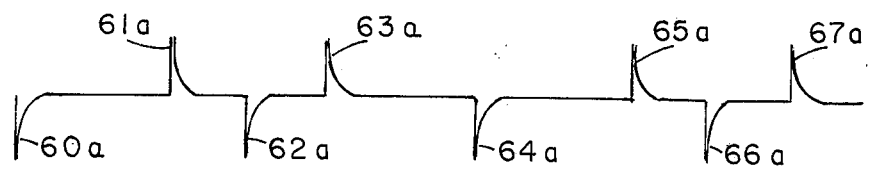
FIGS. 7–10 are representative signals existing at various points of the electrical circuit illustrated in FIG. 11 forming part of the credit card reader of the present invention.
Figure 8:
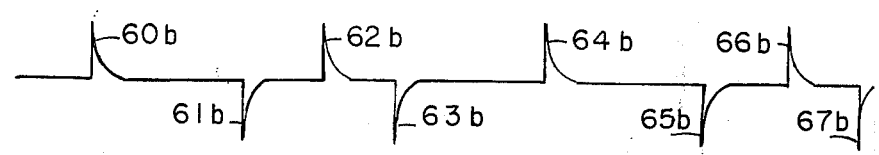

An exemplary coded signal recorded in the Aiken code is shown in FIG. 6. The signal represented is 0-1-0-0-1. The pulses or spikes 60a–67a shown in FIG. 7 represent the output of the first or upstream magnetic recording head 18a which extracts or reads the data on the credit card magnetic strip 12a. However, the output of the first reading head is inverted by any conventional means. For example, an inverted signal can be obtained from the recording head 18a by grounding an appropriate output lead of the coil or winding of the magnetic head. Alternately, an inverting amplifier may be utilized. In FIG. 8, an identical pulse train is shown wherein pulses or spikes 60b–67b are shown "delayed" with respect to the pulse train of FIG. 7 and shown non-inverted. It should be borne in mind that the diagrams of FIGS. 7 and 8 will generally have the same appearance and will be generally related to one another in the same manner shown irrespective of the speed or velocity at which the magnetic heads scan the magnetic strip 12a. Thus, at higher scanning speeds, the diagrams, plotted on a time scale, will generally tend to be more compressed while lowering the scanning speed will expand both the diagrams correspondingly. Since the outputs of both magnetic heads 18a and 18b will change in a like manner, the general appearance and relationship between the two pulse trains will remain the same, in a possibly more expanded or compressed state.

Figure 9:
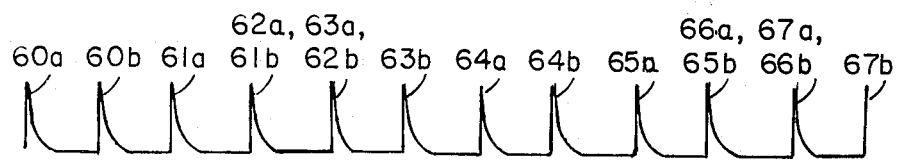
Figure 10:
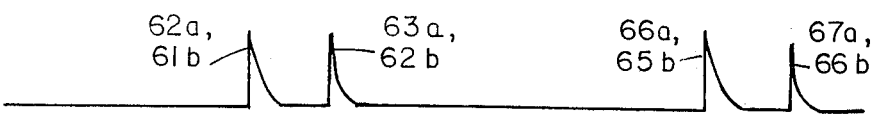

FIGS. 9 and 10 represent the outputs of the credit card reader in accordance with the present invention. In FIG. 9, the rectified sum of the pulses shown in FIGS. 7 and 8 is illustrated. The pulse train shown in FIG. 9 represents a series of clock pulses which are suitable to identify and synchronize coded information. Of particular importance is that the pulse train shown in FIG. 9 is not independently generated as with many conventional internal clocks are but is generated by the reading out process of the magnetic heads 18a and 18b. The frequency or spacing between the clock pulses of FIG. 9 is dependent or is a function of the scanning rate or the relative speed between the magnetic readout heads and the credit card during the reading thereof. Herein lies an important feature of the present invention. The clock pulses automatically adjust the spacing therebetween or the clock frequency changes to accommodate the variations of credit card scanning or reading speeds. The clock pulses are derived in a very simple manner, as to be described hereafter, and eliminate the need for complex circuitry conventionally required to synchronize an independent clock frequency with the mechanical movement of reading heads or a credit card to provide synchronism therebetween.

FIG. 10 represents the sum or coincidence of the rectified pulses shown in FIGS. 7 and 8. Thus, coincidence occurs between pulses 62a and 61b; 63a and 62b; 66a and 65b; and 67a and 67b. Referring to FIG. 6, it will be noted that output pulses are generated only when a "1" binary condition exists. Consequently, the summation of the rectified pulses at the outputs of the spaced magnetic readout heads provides the required information as to the "0" or "1" binary conditions or states recorded on the tape 12a. The train of clock pulses shown in FIG. 9 indicates the points at which inquiry is to made as to the presence or absence of a pulse at the output of a coincidence gate to be described. When a pulse at the output of the coincidence gate is not present simultaneously with the occurrence of a clock pulse, the state recorded on the magnetic strip is "0". On the other hand, when a pulse is present at the output of the coincidence gate simultaneously with the generation of a clock pulse, a "1" state is indicated.

While numerous electrical configurations can be devised by persons skilled in the art to accomplish the functions described in connection with FIGS. 6–10, an illustrative circuit as whown in FIG. 11. Here, a tape 12a moves in the direction generally indicated by the arrow 80. A magnetized area 82 is shown whose width is equal to the spacing between the heads 18a and 18b.

As should be clear from an examination of FIGS. 7–10, coincidence pulses, indicating the presence of a "1" binary condition, takes place only when a transition is simultaneously detected by each of the spaced magnetic heads 18a and 18b. Such a condition is illustrated in FIG. 11. As is well known to those skilled in the art, ring magnetic heads of the type contemplated only provide output indications during transition times and provide no output when a constant or steady magnetic field is present. Consequently, the simultaneous appearance of two transition regions, here the leading and trailing edges 84, 86, at the heads 18a and 18b will generate, in accordance with the principles shown in FIGS. 7–10, a "1" binary signal.

As should be clear from an examination of FIG. 11, the leading edge 84 of the magnetized area 82 will first be detected by the magnetic head 18 which can be considered to be upstream of the tape relative to the movement thereof. The magnetic head 18b will detect and generate an output signal when the leading edge 84 passes the same. The time delay between the same signals detected by each of the heads 18a and 18b corresponding to the leading edge 84 is a function of the spacing between the magnetic heads as well as the velocity of the magnetized tape strip 12a in the direction 80. However, a comparison between the leading edge 84 and a signal transition 86 corresponding to a "1" binary signal will provide a simultaneous signal at the heads 18a and 18b irrespective of the velocity of the magnetized strip 12a. The absence of a transition 86 occurs when a binary "0" has been encoded on the magnetic strip. The lack of a simultaneous signal from heads 18a and 18b is an indication that a "0" binary signal has been decoded.

The rectification of the output signals emanating from the magnetic head 18b is accomplished by means of a rectifier 88. Any conventional rectifier may be utilized for this purpose. Here, the rectifier 88 comprises an OR gate 90 one of whose inputs is directly connected to the magnetic head 18b and the other input which is connected to the magnetic head 18b by means of an inverting amplifier 92. Similarly, the magnetic head 18a comprises an OR gate 96 connected to the magnetic head 18a directly as well as through an inverting amplifier 98. The outputs of the OR gates 90 and 96 will be the trains of pulses shown in FIGS. 7 and 8 but rectified.

To obtain the output signal shown in FIG. 10, the output of each of the rectifiers 88 and 96 are transmitted to an AND gate 100 which functions as a coincidence gate. The output at the terminal 102 provides the output pulses shown in FIG. 10. The clock pulses shown in FIG. 9 are obtained by feeding the outputs of the rectifiers 88 and 94 to a summer or adder in the form of an OR gate 104. Thus, the train of clock pulses shown in FIG. 9 appears at the output terminal 106.

Described above is a system for reading binary coded data on credit cards and the like which is substantially independent of the scanning speed or reading rate of the data. With the two phase coherent recording code, the reading heads are spaced one half the distance between adjacent binary signals corresponding to the highest frequency or highest density of recorded bits of information. However, with other forms of binary and coding systems, the same spacing information can be obtained by spacing the readout heads one half the distance between adjacent bits of coded data. Where more than one frequency or density is utilized, the magnetic heads must be spaced in accordance with the highest frequency or density. As suggested above, other binary codes may require different processing or decoding circuitry other than that shown in FIG. 11 to arrive at intelligible output data. In each case, however, it is possible to derive a train of clock pulses which is not independently generated but is a function of the velocity at which actual scanning of the recorded data takes place, this guaranteeing synchronization often not realized in prior art systems.

Referring to FIGS. 12 and 13, one arrangement for providing two heads displaced from each other along the direction of the recorded data is illustrated. The magnetic strip 12a is shown provided with magnetized areas 82a–82f. The corresponding output signal recorded in accordance with the Aiken code is depicted in aligned FIG. 13. The signal recorded represents the binary number 1-0-1-0-0-1-0-1-0-1-1.

The dashed outline 108 represents a conventional head configuration provided with double gaps or magnetic readout devices. Such double magnetic heads, whose gaps 110 and 112, shown in outline, are longitudinally aligned with each other, are generally utilized in stereo systems to simultaneously read upper and lower tracks of recorded material. However, such a stereo double magnetic head can be utilized for the purpose of the present invention if angularly displaced about its center point or axis of symmetry as represented by angle 114. The angular displacement 114 is selected to provide a separation 116 along the direction of the magnetic strip 12a which corresponds to one half the distance between adjacent bits. With 75 bits per inch densities, the separation 116 is clearly 1/150th of an inch. While turning or skewing the magnetic head arrangement or unit in this manner somewhat decreases the amplitude developed within the magnetic head coils and also widens the pulses, the output information is sufficient to detect the presence of the pulses and to provide the outputs illustrated in FIGS. 7–10. Thus, in FIG. 12, a simple means for implementing the present invention is shown wherein two longitudinally aligned gaps 110a and 112a are skewed relative to the direction of the magnetic strip 12a to bridge magnetized areas 82a–82f — each magnetized area having a width equal to one half a bit spacing.

In FIG. 14, a magnetic reader head is shown in the form of an E-shaped core 120. The core is made from a magnetic material and is shown to be disposed in substantially a single plane. The core includes a substantially straight bridge section 122 and two curved legs 124 and 126 disposed on opposite sides of the bridge section 122. Each leg emanates from a common end 122a of the bridge section and terminates approximately to another common end 122b. The free end 128 of the curved leg 124 forms, with the end 122b a gap 130. Similarly, the end 132 forms with the end 122b a gap 134. The two gaps 130 and 134 are spaced from each other in the plane of the core. Coils 136 and 138, which may be conventional, are provided on the legs 124 and 126 respectively for generating electrical signals when an associated gap reads magnetically recorded data. The magnetic readout head shown in FIG. 14 is suitable to scan data recorded along a direction parallel to the plane, the upstream gap reading the data before the same data is read by the downstream gap. Therefore, the magnetic head illustrated in FIG. 14 is particularly suitable for utilization in conjunction with the subject credit card reader when the gaps 130 and 134 are spaced one half of a bit distance apart.

While different decoding circuitry and different forms of magnetic heads may be utilized other than that described above, with varying degrees of advantages, the present invention, broadly described, contemplates the utilization of two readout heads spaced one half a bit apart which scans binary coded data recorded in accordance with a predetermined bit density. The outputs from the two readout heads provides both a train of clock pulses as well as information concerning the state of the bits of information independently of the scanning or reading rates. Accordingly, the subject invention is particularly suitable for utilization in point of sale applications. In overcoming many of the above described disadvantages of presently known systems, the present design is simple in construction and economical to manufacture and eliminates many of the criticalities and sources of error which must presently be tolerated.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A credit card reader for reading binary coded data recorded along a length of a credit card, the coded data being in the form of uniformly spaced bits of information, comprising two readout means spaced along a predetermined direction for reading the data on the credit card as the data relatively moves past the respective readout means, said readout means being spaced from each other a distance corresponding to approximately one half the distance between two adjacent bits recorded on the credit card, the credit card and said readout means being relatively movable with respect to each other in a manner to maintain the length of the credit card on which the data is recorded proximate to said readout means and in alignment with said predetermined direction; decoding means connected to said readout means for decoding the data read by said readout means and for generating output signals corresponding to the recorded data independently of the relative speed of movement between said readout means and the credit card, the binary data being recorded in two frequency coherent phase recording, said decoding means including coincidence means for generating an output signal when coincidence occurs between signals of one of said readout means and inverted signals of the other of said readout means.

2. A credit card reader as defined in claim 1, wherein the data is magnetically recorded, and wherein said two readout means comprise two magnetic readout heads.

3. A credit card reader as defined in claim 2, wherein said two magnetic readout heads are mounted on a single unit and have corresponding gaps longitudinally aligned with each other, said single unit being angularly displaced in a plane parallel to the credit card to advance one of said gaps relative to the other of said gaps along said length of the credit card to be read.

4. A credit card reader as defined in claim 2, wherein said magnetic readout heads comprise an E-shaped core of magnetic material formed in a single plane and having a substantially straight bridge section; two legs disposed on opposite sides of said bridge section, each leg emanating from a common end of said bridge section and terminating proximately to another common end to form therewith a gap on a corresponding side of said bridge section, the two gaps so formed by said two legs being spaced from each other in said plane and coil means provided on each of said legs for generating electricals signals when an associated gap reads magnetically recorded data, whereby said gaps are suitable to scan data recorded along a direction parallel to said plane, the upstream gap reading the data before the same data is read by the downstream gap.

5. A credit card reader as defined in claim 1, further comprising guide means to maintain the length of the credit card on which the data is recorded proximate to said readout means and in alignment with said predetermined direction when there is relative movement between the credit card and said readout means, whereby said readout means scans and extracts the recorded data as said readout means relatively move along said length of the credit card.

6. A credit card reader as defined in claim 5, wherein said guide means comprises a support surface and a guide surface substantially normal to said support surface, said readout means being fixed on said support surface in the path of said linear length of the credit card when an edge of the latter parallel to said linear length abuts against and is guided by said guide surface, whereby slidable movement of the credit card on said support surface while guided by said guide surface causes said readout means to scan and extract the data recorded along said length.

7. A credit card reader as defined in claim 5, wherein said guide means comprises a support surface; means for fixing a credit card on said support surface; and a sliding unit movable along a path in opposition to said length when the credit card is fixed on said support surface, said readout means being mounted on said sliding unit, whereby movement of the latter causes said readout means to scan and extract data recorded on the credit card.

8. A credit card reader as defined in claim 1, further comprising rectifying means for rectifying said signals from said readout means; and adding means for adding the rectified signals to provide a series of clock pulses dependent only on the relative movement between the credit card and said readout means.

* * * * *